July 2, 1968  C. T. COOKSON ETAL  3,390,710
CHAIN SAW
Filed April 14, 1966  2 Sheets-Sheet 1
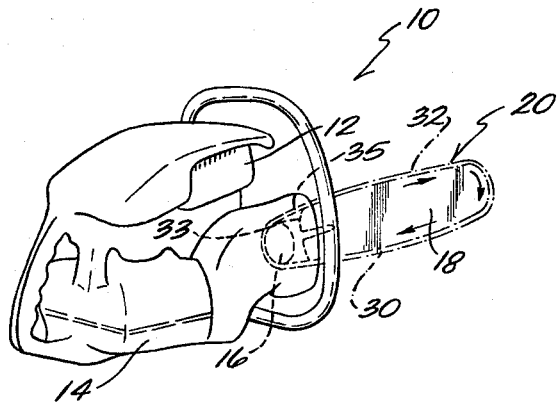
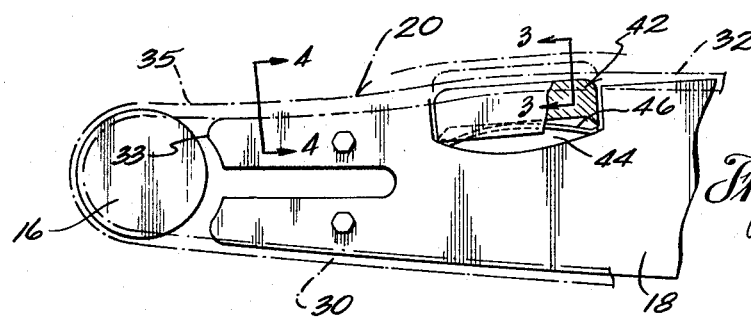
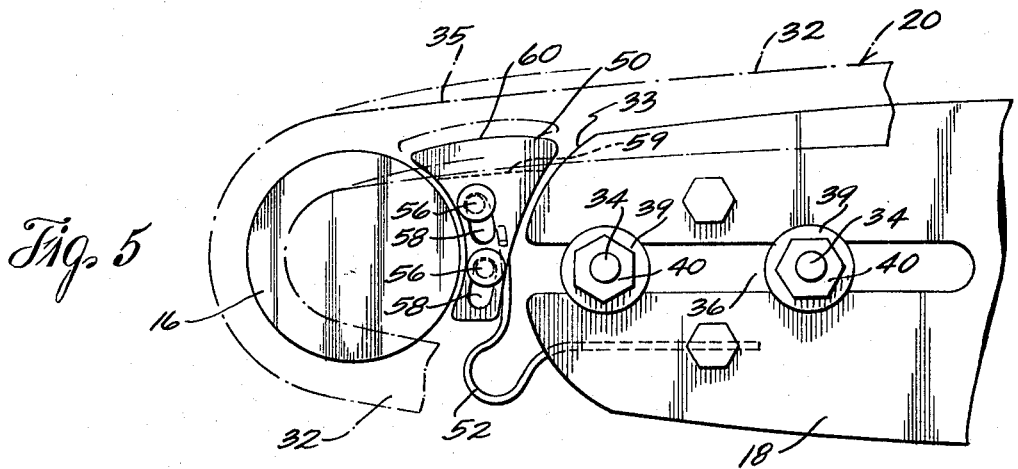
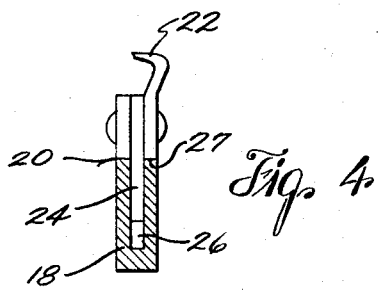
Inventor
Cecil T. Cookson
Hayo E. Deelman
By Wheeler, Wheeler & Wheeler
attorneys.

July 2, 1968  C. T. COOKSON ETAL  3,390,710

CHAIN SAW

Filed April 14, 1966  2 Sheets-Sheet 2

Inventors
Cecil T. Cookson
Hayo E. Deelman

By Whelan, Whelan & Whelan
Attorneys

United States Patent Office 3,390,710
Patented July 2, 1968

1

3,390,710
CHAIN SAW
Cecil T. Cookson and Hayo E. Deelman, Peterborough, Ontario, Canada, assignors to Outboard Marine Corporation, Waukegan, Ill., a corporation of Delaware
Filed Apr. 14, 1966, Ser. No. 542,624
2 Claims. (Cl. 143—32)

This invention relates to chain saws, and more particularly, to automatic saw chain tensioning means for chain saws.

In the past, saw chain tension was continually adjusted to maintain the position of the cutter bar relative to the sprocket. Specifically, such adjustments were desirably made quite often to maintain the desired tension. One recently proposed arrangement for automatically tensioning the saw chain provides for yieldably biasing the cutter bar away from the sprocket. The disclosed invention provides for automatic saw chain tensioning so as to provide for proper saw chain tension with only a few incremental cutter bar adjustments.

An object of the invention is to provide a chain saw having simple, efficient, and economical means for affording automatic saw chain tensioning to prevent saw chain slackness between incremental adjustments of the cutter bar relative to the driving sprocket.

The chain saw is provided with a cutter bar and a drive sprocket carried on a housing which supports an internal combustion engine. The engine is operatively drivingly connected to the drive sprocket, and a saw chain is trained around the sprocket and cutter bar to be driven by the sprocket. In accordance with the invention, means are provided for automatically tensioning the saw chain between incremental adjustments of the cutter bar. For this purpose, the invention provides for cam means disposed to contact the untensioned portion or upper run of the saw chain together with means biasing the cam means against the untensioned portion of the saw chain. The cam means urges the upper run of the saw chain in a direction tending to take up saw chain slack, thereby automatically affording proper tensioning of the saw chain. In operation, it should be noted that the tension means is operative while the cutter bar is fixed with respect to the engine housing or frame, and therefore fixed with respect to the sprocket. When the tensioning means is no longer capable of properly tensioning the chain due to wear, the cutter bar is then adjusted relative to the sprocket to take up saw chain slack beyond the capacity of the tensioning means and therefore affords renewed operation of the tensioning means. Thus, though some cutter bar adjustment is required, the tensioning means greatly reduces the number of adjustments normally required for the operation of the chain saw over a long period of time.

Other objects, advantages, and features become apparent from the following description and accompanying drawings in which:

FIGURE 1 is a perspective view of a chain saw embodying various of the features of the invention;

FIGURE 2 is an enlarged, fragmentary view of a portion of the chain saw shown in FIGURE 1 and embodying various of the features of the invention;

FIGURE 3 is an enlarged, cross sectional view taken along line 3—3 of FIGURE 2;

FIGURE 4 is an enlarged, cross sectional view taken along line 4—4 of FIGURE 2;

FIGURE 5 is an enlarged, fragmentary view of a portion of the chain saw shown in FIGURE 1 and showing a modified form of the invention;

2

Figure 8:
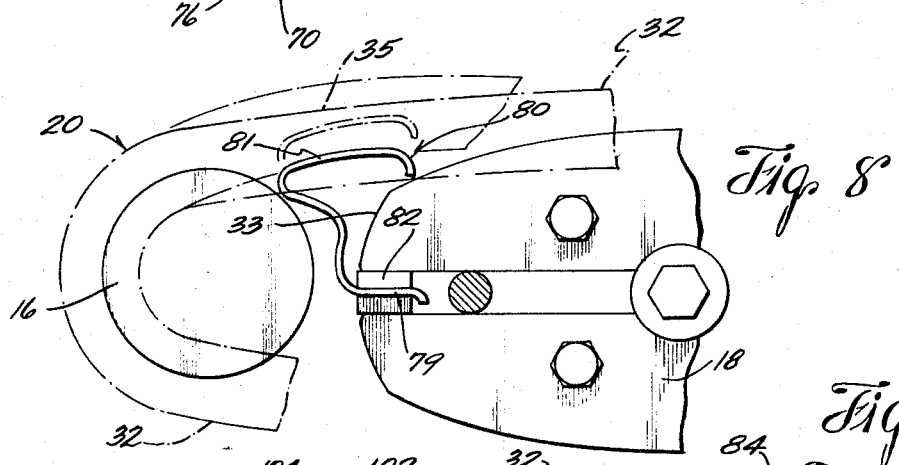
Figure 9:
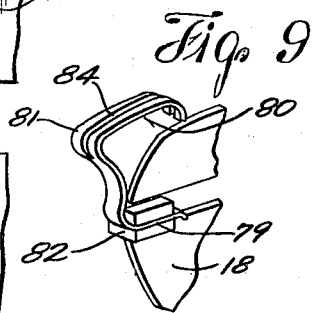
Figure 10:
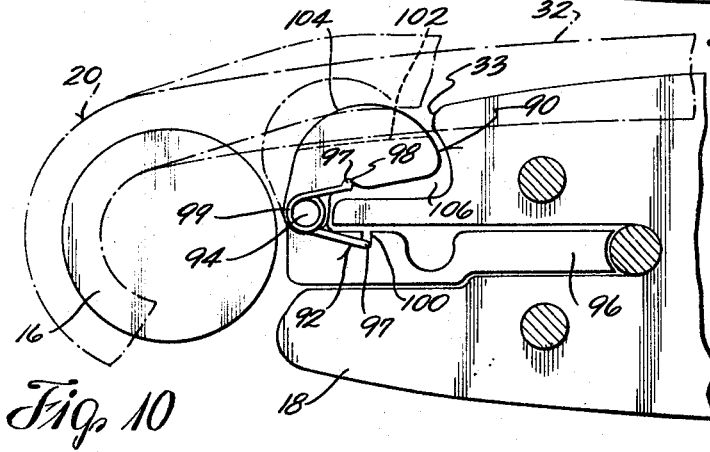

FIGURE 8 is an enlarged, fragmentary view of a portion of the chain saw shown in FIGURE 1 and shown embodying still another modified form of the invention;

FIGURE 9 is a perspective view of a portion of the chain saw shown in FIGURE 8; and FIGURE 10 is an enlarged, fragmentary view of a portion of the chain saw shown in FIGURE 1 and showing a further modified form of the invention.

Referring now to the drawings and more particularly to FIGURE 1, the chain saw of the invention is broadly identified by the numeral 10 and generally includes an internal combustion engine 12 mounted on a casing, frame or housing 14. A drive sprocket 16 is operatively drivingly connected to the internal combustion engine 12, and a cutter bar 18 is carried on the housing 14 proximate the sprocket 16. Trained around the cutter bar 18 and drive sprocket 16 is a saw chain 20 having a cross sectional configuration as shown in FIGURE 4.

Referring to FIGURE 4, the saw chain 20 includes cutting teeth 22 and drive lugs 24 which extend into a guide slot or guideway 26 in the peripheral edge of the cutter bar 18. The lugs 24 are disposed for engagement by the teeth of the drive sprocket 16 to afford driving of the saw chain 20 around the cutter bar 18.

The saw chain 20 is driven by the sprocket 16 in a clockwise direction as shown by the arrows in FIGURE 1, whereby the lower run or tensioned portion 30 of the saw chain 20 is under tension and the upper run or untensioned portion 32 is not under tension. The drive sprocket 16 is spaced from the trailing or the saw chain entrance end 33 of the cutter bar 18 to thereby leave an unsupported span 35 of saw chain 20 between the sprocket 16 and the entrance end 33.

The unsupported span 35 of saw chain 20 may be supported and guided by guide plates which can be carried on the housing 14 and disposed on opposite sides of the saw chain 20 in the area of the unsupported span 35. The guide plates are not show in the illustrated embodiment.

As shown best in FIGURE 5, the cutter bar 18 is selectively adjustable longitudinally of its length by means of spaced studs 34 extending from the housing 14 and respectively received in an elongated slot 36 in the cutter bar 18. Each stud 34 receives a washer 39 and a nut 40 to provide selective clamping of the cutter bar 18 to the housing 14. As the saw chain 20 and cutter bar 18 wear, the nuts 40 can be loosened and the cutter bar 18 can be moved in a direction away from the sprocket 16 to take up the slack in the saw chain 20.

Means are provided for automatically tensioning the saw chain to prevent saw chain slackness between incremental adjustments of the cutter bar relative to the sprocket. Said means is effective to automatically tension the saw chain 20 until the saw chain slack has reached a point which is beyond the capacity of the tensioning means to take up. Then the cutter bar 18 is moved to take up the saw chain slack and the automatic tensioning means is reset to a zero adjustment position. The range of slackness over which the tensioning means is effective is large enough to greatly reduce the number of cutter bar adjustments normally required in operating a conventional chain saw.

In the embodiment shown in FIGURE 2, the tensioning means is wholly carried on the cutter bar 18 and comprises a cam plate 42 carried in a suitable slot 44 in the cutter bar 18, together with spring means in the form of a spring 46. The spring 46 is disposed between the underside of the cam plate 42 and the cutter bar portion defining the bottom of the slot 44 to thereby bias or urge the cam plate 42 away from the cutter bar 18 and into engagement with the saw chain 20. The cam plate 42 includes a groove 48, as shown in FIGURE 3, which receives the drive lugs 24 and provides support of the saw chain 20 in generally the same manner as does the cutter bar 18. The cam plate 42 under the action of spring 46 urges the untensioned portion 32 of the saw chain 20 outwardly or away from the cutter bar 18 (as shown in phantom lines in FIGURE 2) to thereby take up any chain slack. As used herein, outwardly is defined as in a direction away from the cutter bar 18.

In an alternative embodiment, shown in FIGURE 5, the tensioning means comprises a cam plate 50 disposed between the sprocket 16 and the saw chain entrance end 33 of the cutter bar 18, together with spring means in form of a spring 52 disposed to bias the cam plate 50 outwardly and into engagement with the saw chain 20, thereby urging the upper run 32 of the chain 20 outwardly and taking up any chain slack, as shown by the phantom lines in FIGURE 5. The spring 52 is respectively fixed, by any suitable means, to the frame 14 and the cam plate 50. As shown in FIGURE 5, the cam plate 50 engages the span 35 of saw chain 20 between the sprockets 16 and the saw chain entrance end 33 of the cutter bar 18. As previously mentioned, the aforementioned span 35 of the saw chain is generally unsupported unless guide plates (not shown) are used. The cam plate 50 is movably carried on the frame or housing 14 of the chain saw 10 by means of bolts or mounting lugs 56 extending from the housing 14 and received in guide slots 58 in the cam plate 50.

The cam plate 50 is shaped to fit the contour of the gap between the sprocket 16 and the entrance end 33 of the cutter bar 18 and is guided by the bolts 56 and guide slots 58 for movement along a predetermined path under the biasing action of spring 52. The cam plate 50 has a groove 59 which receives the drive lugs 24 of the saw chain 20 and has contoured surfaces 60 which support the saw chain 20 in a similar manner as does the cutter bar 18.

Figure 6:
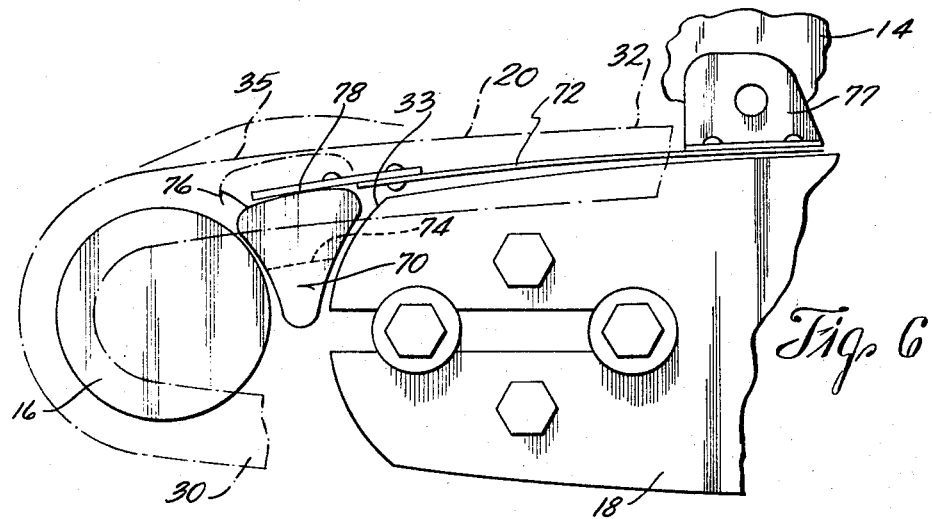
FIGURE 6 is an enlarged, fragmentary view of a portion of the chain saw shown in FIGURE 1 and showing another modified form of the invention.

In another alternative embodiment shown in FIGURE 6, the tensioning means comprises a cam member 70 disposed between the sprocket 18 and the chain entrance end 33 of the cutter bar, together with spring means in the form of a leaf or cantilevered spring 72 biasing the cam plate 70 into engagement with the span 35 of the saw chain 20 to thereby urge the upper run 32 outwardly, as shown by the phantom lines in FIGURE 6. The cam plate 70 includes a groove 74 receiving the drive lugs 24 of the saw chain 20 and includes supporting surfaces 76 on opposite sides of groove 74 (see FIGURE 7) which support the saw chain 20 in a similar manner as does the cutter bar 18.

Figure 7:
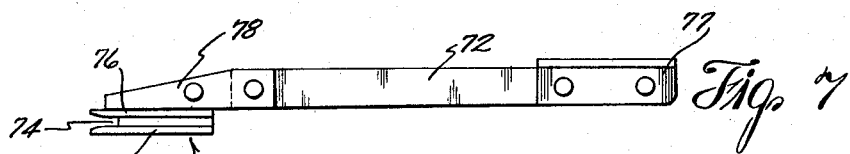
FIGURE 7 is an end elevational view of a component of the chain saw shown in FIGURE 6.

The leaf spring 72 has an end connected to a mounting bracket 77 which is fixed to the housing 14 (as shown in FIGURE 6) or alternatively to the engine 12, and has an opposite end which is connected to a bracket 78. The bracket 78 carries the cam plate 70 between the sprocket 16 and the entrance end 33 of the cutter bar 18, as shown in FIGURE 7. The cam plate is contoured to fit the gap between the sprocket 16 and entrance end 33 and is offset from the leaf spring 72 to thereby afford unimpeded travel of the saw chain 20 over the cam 70 without interference by the leaf spring 72.

In still another alternative embodiment shown in FIGURE 8, the tensioning means comprises spring means in the form of a formed or shaped spring 80 disposed between the drive sprocket 16 and entrance end 33 of the cutter bar 18. The spring 80 is disposed to engage the span 35 of the saw chain 20 and to bias or urge the untensioned portion 30 of the saw chain 20 outwardly or away from the cutter bar 18, as shown by the phantom lines in FIGURE 8. The spring 80 has an end 79 connected to a mounting block 82 which is fixed to the frame 14 of the chain saw 10, and has an opposite end portion 81 which is formed with a groove 84 (see FIGURE 9) for receiving the drive lugs 24 of the chain saw 10 and which is contoured or shaped for supporting the saw chain 20. The spring 80 is disposed to contact the span 35 of the saw chain 20 between the sprocket 18 and the cutter bar entrance end 33.

In still another alternative embodiment shown in FIGURE 10, the tensioning means includes a cam plate 90 disposed in a notch 106 in the entrance end 33 of the cutter bar 18 and biased by a spring means in the form of a torsion spring 92 to engage the untensioned portion 32 of the saw chain 20 to urge the saw chain 20 outwardly as shown by the phantom lines in FIGURE 10. The cam plate 90 is pivotally connected to the frame 14 by the pivot means 94. The torsion spring 92 is disposed between the underside of the cam plate 90 and a mounting block 96 fixed to the frame 14, and is provided with inturned ends 97 which engage suitable grooves 98 and 100 respectively in the cam plate 90 and the mounting block 96. The circular loop 97 of the torsion spring 92 is disposed around the pivot means 94. The cam plate 90 includes a groove 102 and a contoured surface 104 to receive and support the saw chain 20. The cam plate 90 is biased outwardly by spring 92 into engagement with the span 35 of saw chain 20 and pivotally moves to a position shown by the phantom lines in FIGURE 10.

If desired, in the embodiment shown in FIGURES 5 through 10, the various cam plates or cam members can be mounted on the guide plates referred to heretofore but not shown or on the cutter bar. Also, the tensioning means will take up saw chain slack until the various spring means employed approach undeflected positions, wherein the spring force cannot afford proper chain tensioning. Thereafter, the cutter bar 18 is moved, as previously described, to thereby afford renewed operation of the tensioning means. The cutter bar adjustments are infrequent compared with a conventional chain saw. Also, if desired, the tensioning means heretofore described in regard to FIGURES 5–10 can be located wholly on the cutter bar 18 rather than the frame 14, in which case the tensioning means would move with the cutter bar 18.

Various of the features of the invention are set forth in the following claims.

What is claimed is:

1. A chain saw comprising a prime mover, a housing, a cutter bar adjustably mounted on said housing and fixed to said housing during normal operation of said chain saw and including a saw chain entrance end, a sprocket operatively connected to said prime mover adjacent to said saw chain entrance end, an endless chain trained around said cutter bar and said sprocket and including a portion provided by a span of saw chain between said sprocket and said entrance end of said cutter bar, a cam plate movably supported by one of said housing and said cutter bar and located between said sprocket and said entrance end of said cutter bar for engagement with said portion of said saw chain, spring means supported by one of said housing and cutter bar for biasing said cam plate into engagement with said portion of said saw chain, whereby said saw chain portion is tensioned, and means for guiding the movement of said cam plate along a path generally concentric with the axis of said sprocket.

2. A chain saw in accordance with claim 1 wherein said cam plate includes guideways and wherein mounting bolts extend from one of said housing and said cutter bar and are received in said guideways to afford movement of the cam plate by said spring means along said path.

References Cited

UNITED STATES PATENTS

| 2,487,322 | 11/1949 | Eriksson | 143—32 |
| 3,250,304 | 5/1966 | Merz | 143—32 |

FOREIGN PATENTS

| 1,173,229 | 7/1964 | Germany. |
| 272,341 | 5/1951 | Switzerland. |

DONALD R. SCHRAN, *Primary Examiner.*